(12) United States Patent
Rothmeier et al.

(10) Patent No.: US 9,940,378 B1
(45) Date of Patent: Apr. 10, 2018

(54) OPTIMIZING REPLICATION OF SIMILAR BACKUP DATASETS

(71) Applicant: EMC Corporation, Hopkinton, MA (US)

(72) Inventors: Dieter Rothmeier, Soquel, CA (US); Scott H. Ogata, Lake Forrest, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 345 days.

(21) Appl. No.: 14/502,543

(22) Filed: Sep. 30, 2014

(51) Int. Cl.
*G06F 17/30* (2006.01)
*G06F 11/14* (2006.01)

(52) U.S. Cl.
CPC .... *G06F 17/30575* (2013.01); *G06F 11/1453* (2013.01)

(58) Field of Classification Search
CPC ............. G06F 11/1453; G06F 11/1461; G06F 11/1469; G06F 17/30156; G06F 17/30578; G06F 17/30575; G06F 17/30215; G06F 3/065; G06F 3/0641
USPC ......... 707/649, 639, 654, 999.203, E17.002, 707/635, 637, 640
See application file for complete search history.

(56) References Cited

U.S. PATENT DOCUMENTS

| | | | | |
|---|---|---|---|---|
| 6,604,118 B2 * | 8/2003 | Kleiman | ........... | G06F 17/30067 |
| 9,152,500 B1 * | 10/2015 | Gardner | ............ | G06F 17/30088 |
| 2003/0182313 A1 * | 9/2003 | Federwisch | ......... | G06F 11/2066 |
| 2007/0186001 A1 * | 8/2007 | Wayda | .................. | G06F 3/0607 709/230 |
| 2007/0294495 A1 * | 12/2007 | Uchida | ............... | G06F 11/1451 711/162 |
| 2012/0123999 A1 * | 5/2012 | Ashutosh | ............ | G06F 11/1453 707/618 |
| 2013/0073519 A1 * | 3/2013 | Lewis | ............... | G06F 17/30215 707/610 |
| 2013/0159257 A1 * | 6/2013 | Rao | ................... | G06F 17/30088 707/649 |
| 2015/0066857 A1 * | 3/2015 | Dayal | ............... | G06F 17/30088 707/639 |

* cited by examiner

*Primary Examiner* — Robert Beausoliel, Jr.
*Assistant Examiner* — Pedro J Santos
(74) *Attorney, Agent, or Firm* — Peter Jovanovic; Theodore A. Chen; Krinshnendu Gupta

(57) ABSTRACT

The present disclosure discusses systems and methods for replicating backups between deduplicated storage devices. Differences between related backups may be identified, and only those differences may be transferred. This may minimize data transfer and optimize resource consumption.

14 Claims, 5 Drawing Sheets

OPTIMIZING REPLICATION OF SIMILAR BACKUP DATASETS

CROSS REFERENCE TO RELATED APPLICATIONS

This application is related to co-pending U.S. patent application Ser. No. 14/231,293 for Establishing FILE RELATIONSHIPS BASED ON FILE OPERATIONS filed on Mar. 31, 2014, which is incorporated herein by reference for all purposes.

FIELD OF THE INVENTION

This invention relates generally to data backups, and more particularly to systems and methods for replicating data backups.

BACKGROUND OF THE INVENTION

Certain data storage system operations may involve creating a file that is wholly or partly a clone or other copy of another file. For example, certain snapshot and/or related technologies may involve create a clone or other copy of a file or set of files.

Data storage systems may be configured to take advantage of the fact that files created by cloning or otherwise copying existing files have, at least initially, a great deal of data in common with the file based on which they were created. Deduplication storage systems, for example, may store each data segment only once, and may for each file that includes a given segment include only a pointer to the single stored instance of the segment.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
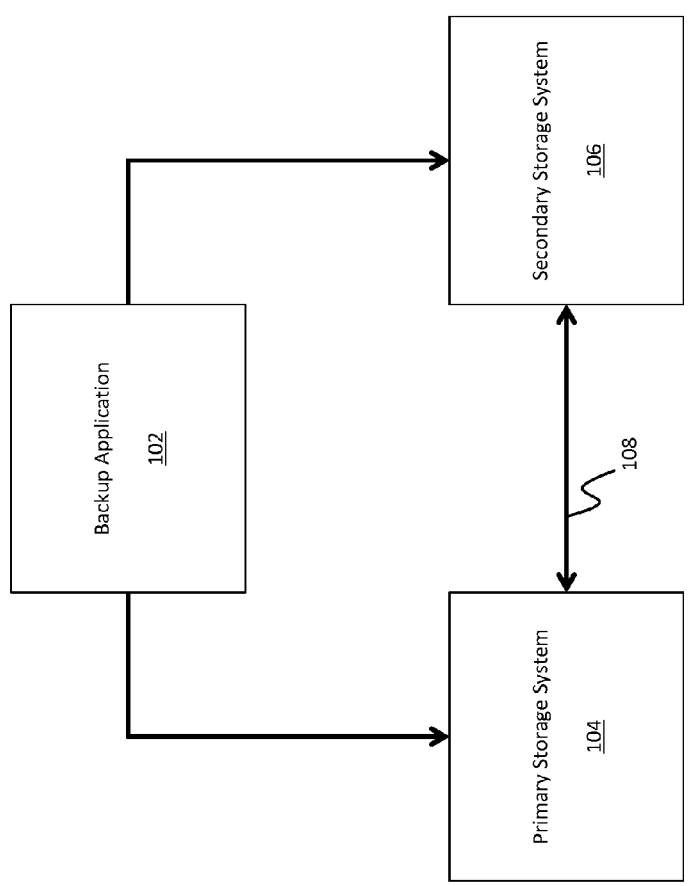
FIG. 1 depicts a block diagram of a backup system consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses system, methods, and processes for replicating data backups from a source storage system to a destination storage system. Replicating backups between storage systems provides redundancy, which may be beneficial if one of the systems fails. For example, if a backup is stored on two data systems and one of the systems is destroyed, the backup is not lost because it still resides on the second system.

Replicating backups may include costly operations. For example, transferring an entire data backup from a source storage to a destination storage may include moving large amounts of data, thereby consuming a large amount of network bandwidth and time. Some systems may be designed to only transmit data that does not already reside on the destination storage. Such a system may, however, need to send communications between the source and the destination storage to determine what data may be missing on the destination. The systems and processes discussed herein alleviate some of these concerns.

FIG. 1 depicts a backup system consistent with an embodiment of the present disclosure. In the example shown, a backup application 102 provides backup data to a primary data storage system 104. For example, an EMC® Avamar® backup agent, application, appliance, and/or system may provide backup data to a primary data center and/or other location at which primary data storage system 104 is installed. Primary data storage system 104 may comprise a deduplicated storage system. In various embodiments, primary deduplication data storage system 104 may comprise an EMC® Data Domain® deduplication storage system. In the example shown, primary data storage system 104 replicates data to a secondary data storage system 106 over a wide area network (or other network) 108. Data may be replicated from primary deduplication data storage system 104 to secondary deduplication data storage system 106, for example, to provide disaster recovery protection, e.g., by enabling data backed up by backup application 102 to be recovered from secondary data storage system 106 if primary data storage system 104 were to become unavailable.

Figure 2:
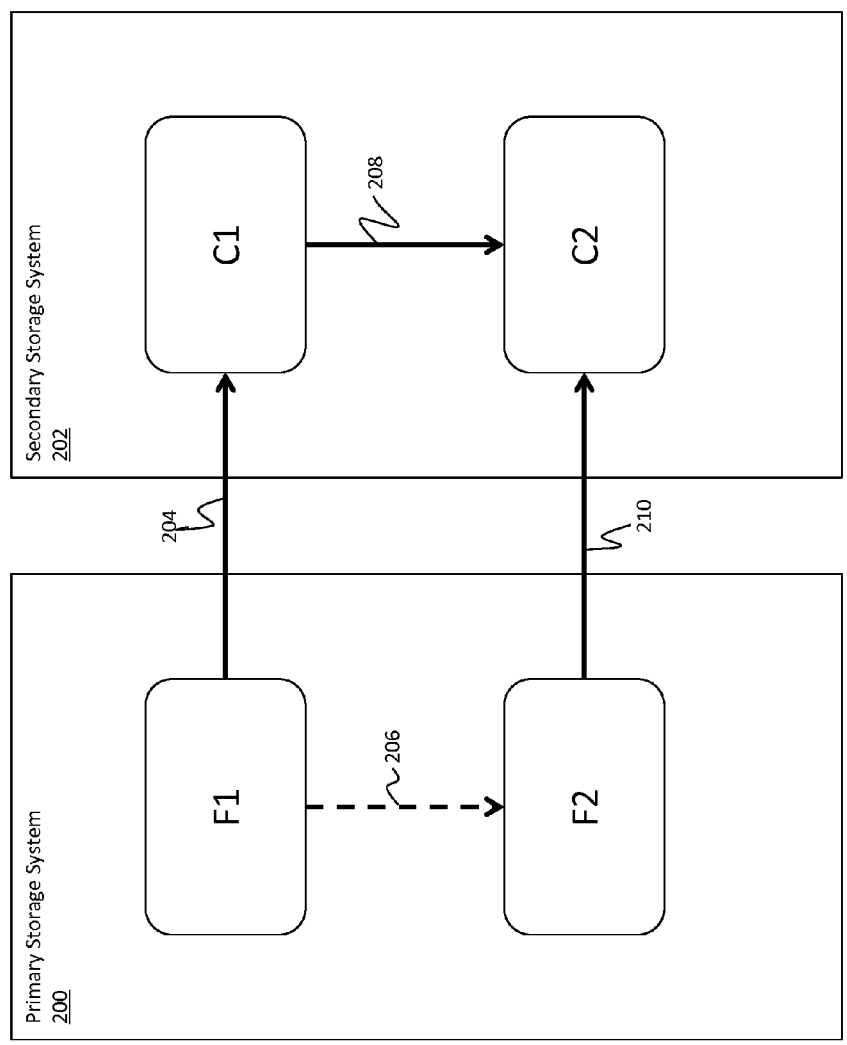
FIG. 2 depicts a replication process consistent with an embodiment of the present disclosure.

FIG. 2 depicts a system and process for replicating data backups from a primary backup storage system to a secondary backup storage system. Data object F1 may be a backup received from a backup application, such as backup application 102. The backup may be taken from a production server, personal computer, or the like. In an embodiment, data object F1 may comprise a file stored on a deduplicated storage system, such as primary storage system 200.

At operation 204, a baseline replica of data object F1 may be created on secondary storage system 202. Data object F1 may be replicated to secondary storage 202, and stored on the secondary storage system as copy C1. This initial replication may occur in several ways. In one embodiment, the backup appliance may transmit the backup data directly to secondary storage system 202 before, after, or while it transmits the same backup to primary storage system 200. This allows F1 and C1 to be created at substantially the same time, without any communication between primary storage system 200 and secondary storage system 202. Additionally or alternatively, primary storage system 200 may transmit data object F1 in its entirety to secondary storage system 202, and secondary storage system 202 may store the data object as C1. In some embodiments, primary storage system may divide data object F1 into chunks, create a hash fingerprint for each chunk, and initially transmit only the fingerprints to secondary storage system 202. Upon receiving a fingerprint, secondary storage system may determine whether it already contains the data represented by the fingerprint. This could occur, for example, by consulting a hash table. If secondary storage system 202 does have the data represented by the fingerprint, it may construct that chunk of data object C1 using the local data. If secondary storage system 202 does not have the data represented by the fingerprint, it may request the data from primary storage system 200 which may transmit the data to secondary storage system 202 in response.

At operation 206, primary storage system 200 may receive a second backup from a backup application and store it as data object F2. Primary storage system 200 may also receive an indication from the backup appliance that F2 and F1 are related. For example, F1 and F2 may comprise backups of the same physical or logical data set. As a result, much of the data contained in F1 and F2 may be similar.

Data object F2 may be replicated to secondary storage system 202 and stored as data object C2. Since F1 and F2 are related, however, C1 and C2 must also be related. Since C1 and C2 likely contain very similar data, it may not be desirable to replicate F2 into C2 using the same methods as replicating F1 into C1. Rather, the following process may be used to further minimize data transfer.

Secondary storage system 202 may receive an instruction to create a new backup data object, C2, and an indication that the new backup data object is related to a previous backup, C1. In some embodiments, this instruction may be received from a backup application and/or primary storage system 200.

In response to the instruction, at operation 208 secondary storage system 202 may create a snapshot of the related backup. In this example, secondary storage system may create C2 by taking a snapshot of C1. A snapshot operation may comprise creating a copy of a source file, such as C1, without replicating the source file's underlying data. A source file may be comprise an address or file handle pointing to the underlying data. Creating a snapshot may comprise copying this address or handle into a new file, rather than replicating the underlying data itself. This allows exact copies of the source file to be created very quickly with minimal operations. If the secondary storage system is a DataDomain system, the snapshot may be created using a fastcopy operation.

Before, after, or while the snapshot is created on secondary storage system 202, primary storage system 200 may identify differences between F1 and F2. Since the data in the two backups is likely substantially similar, the only data that needs to be transferred to secondary storage system 202 is the differences. The remaining data already exists on secondary storage system 202 in backup C1. To identify the differences, primary storage system 200 may iterate through the F1 and F2 and compare the hashes of the atomic units of each. For example, if an atomic unit is defined as 8 kb, the hash of each 8 kb chunk of F2 can be compared to the 8 kb chunks of F1. If there is a match, the data is the same and does not need to be transferred. If there is a difference, the data is different and does need to be transmitted.

Additionally or alternatively, the difference may be determined using a tree structure. An initial hash may be taken of each backup, in this case F1 and F2. If the hashes match, the data has not changed between the two backups and nothing needs to be transferred to secondary storage system 202. If they are different, both F1 and F2 may be divided into two or more segments, and the hashes of each may be compared to each other. Any time the hashes match, the data already exists on the secondary storage system and does not need to be transferred. Any time the hashes are different, the data may be marked as different and prepared for transfer, or the segment may be further divided to identify more atomic differences. The division may occur until the lowest atomic unit (e.g. 8 kb) is reached.

Once the differences between F1 and F2 are identified, they may be transmitted to secondary storage system 202 at operation 210. The differences may be transmitted in real-time as they are identified, or they may be compiled and transmitted as a whole once they are all identified. In one embodiment, all of the differences and their corresponding data are transferred. Additionally or alternatively, further operations may be taken to ensure that only data not already present on secondary storage system 202 is transmitted. These operations are discussed in detail with reference to FIG. 4 below.

As secondary storage system 202 receives the differences, they may be applied to snapshot C2. Applying the changes may comprise updating one or more address references created by the snapshot process to point to the new or changed underlying data. Once the differences are successfully applied, C2 may be an exact replica of F2.

Figure 3:
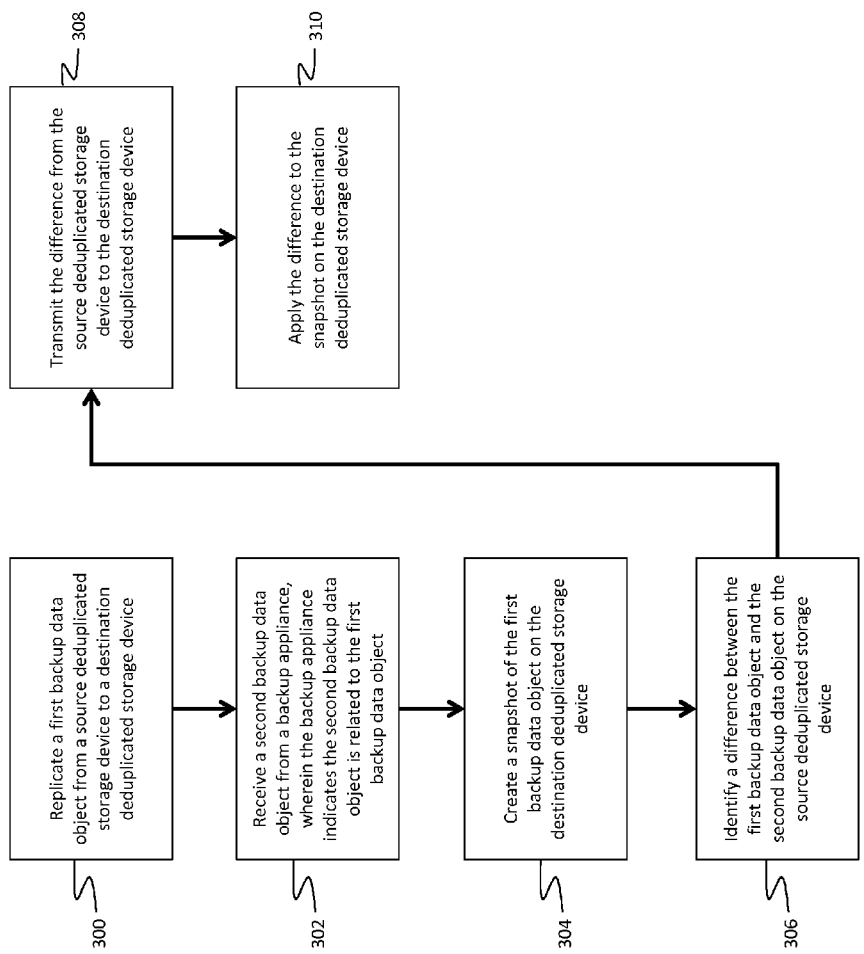
FIG. 3 depicts a flowchart of a replication process consistent with an embodiment of the present disclosure.

Turning now to FIG. 3, a flowchart for replicating data backups between two storage systems is discussed. At 300, a first data object may be replicated from a source deduplicated storage device to a destination deduplicated storage device. The source and destination deduplicated storage devices may be substantially similar to primary storage system 200 and secondary storage system 202. Additionally, the first data object may be similar to F1, and may be replicated into C1.

At 302, a second backup data object may be received from a backup appliance. This second backup data object could be, for example, F2. In some embodiments, the second backup data object may be related to the first backup data object. For example, they may be different point in time backups of the same data set. The backup appliance may notify the source and/or destination deduplicated storage device of this relationship.

At 304, a snapshot of the first backup data objet may be created on the destination deduplicated storage device. This snapshot process may be similar to operation 208, and in an embodiment may result in a snapshot file substantially similar to C2.

At 306, a difference between the first backup data object and the second backup data object may be identified. This difference could be identified, for example, by the source deduplicated storage device. The difference may comprise data added to, changed, or removed from the second backup data object.

At 308, the difference may be transmitted from the source deduplicated storage device to the destination deduplicated storage device. This could be, for example, a network transmission and may be substantially similar to operation 210.

Finally, at block 310, the difference may be applied to the snapshot on the destination deduplicated storage device. Applying the difference to the snapshot may result in a replicated copy of the second backup data object on the destination deduplicated storage device. This process therefore provides redundancy, without needing to transfer complete copies of the second backup data object between storage systems.

Figure 4:
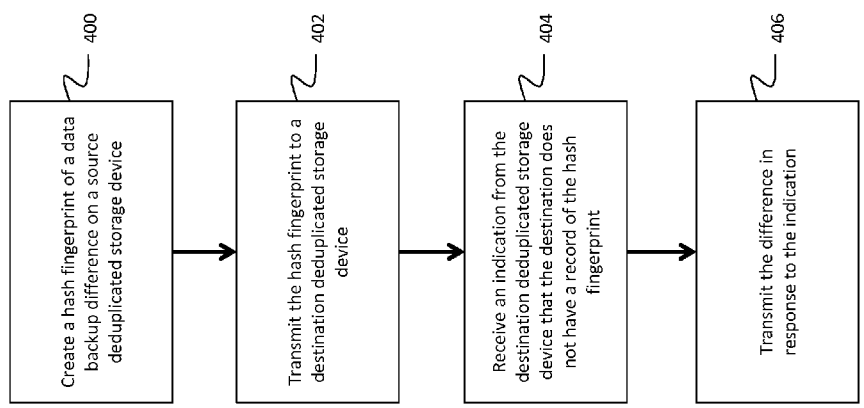
FIG. 4 depicts a data transfer process consistent with an embodiment of the present disclosure.

Turning now to FIG. 4, a process for transferring the differences from a source deduplicated storage device to a destination deduplicated storage device is discussed. Deduplicated storage devices may implement mechanisms to reduce duplicate data transfer. Just because a difference is identified between two related backup objects does not mean the data the difference represents is not already on the destination device. The data could, for example, exist in a separate, unrelated backup. The process of FIG. 4 further reduces the amount of duplicate data transferred between storage systems by first checking to see if the data exists at the destination. This check could occur, for example, as part of operation 210 or block 308.

At block 400, a hash fingerprint of a data backup difference may be created on the source deduplicated storage device. This fingerprint could be generated, for example, from the data the difference represents. In an embodiment, the fingerprint may be created as the difference is identified. Additionally or alternatively, all the differences may be identified and then a fingerprint may be generated for each. The fingerprint may be generated using a hashing algorithm robust enough to minimize hash collisions, and each fingerprint may therefore uniquely identify a chunk of data.

At block 402, the fingerprint may be transmitted to the destination deduplicated storage device. This transmission could occur, for example, before the difference itself is transferred. The destination deduplicated storage device may then determine if the data identified by the fingerprint already exists on the destination device. For example, an index comprising hashes of all the data on the storage device may be consulted. If the fingerprint is found, the already existing data may be applied to a snapshot, such as snapshot C2. If the fingerprint is not found, the destination deduplicated storage device may send a request back to the source deduplicated storage device for the data.

At 404, the source deduplicated storage device may receive an indication that the destination deduplicated storage device does not have a record of the fingerprint. This may indicate that the destination deduplicated storage device does not already have a copy of the data, as noted above. In response to the indication, the difference identified by the fingerprint may be transmitted to the destination deduplicated storage device. The difference may then be applied to a snapshot, as discussed above. This process thereby prevents the unnecessary transmission of duplicate data between the source and destination deduplicated storage devices.

Figure 5:
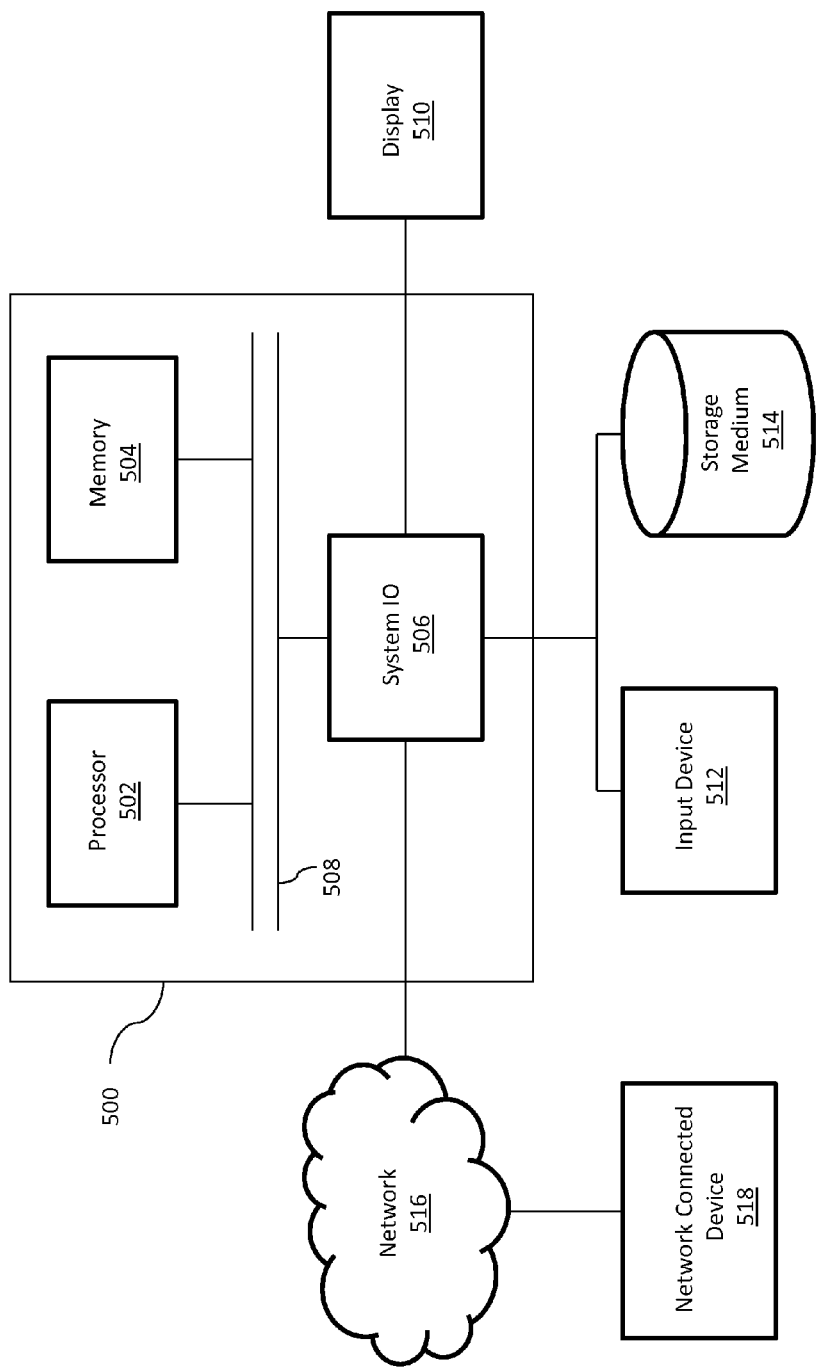
FIG. 5 depicts a general purpose computer system consistent with an embodiment of the present disclosure.

FIG. 5 depicts a computer system which may be used to implement different embodiments discussed herein. General purpose computer 500 may include processor 502, memory 504, and system IO controller 506, all of which may be in communication over system bus 508. In an embodiment, processor 502 may be a central processing unit ("CPU") or accelerated processing unit ("APU"). Some embodiments may comprise multiple processors, or a processor with multiple cores. Processor 502 and memory 504 may together execute a computer process, such as the processes described herein.

System IO controller 506 may be in communication with display 510, input device 512, non-transitory computer readable storage medium 514, and/or network 516. Display 510 may be any computer display, such as a monitor, a smart phone screen, or wearable electronics and/or it may be an input device such as a touch screen. Input device 512 may be a keyboard, mouse, track-pad, camera, microphone, or the like, and storage medium 514 may comprise a hard drive, flash drive, solid state drive, magnetic tape, magnetic disk, optical disk, or any other computer readable and/or writable medium. Storage device 514 may also reside inside general purpose computer 500, rather than outside as shown in FIG. 1.

Network 516 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 516 may be either wired or wireless or any combination thereof, and may provide input to or receive output from IO controller 506. In an embodiment, network 516 may be in communication with one or more network connected devices 518, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for replicating data backups on deduplicated storage devices, the method comprising:
replicating a first backup data object from a source deduplicated storage device to a destination deduplicated storage device;
storing the first backup data object on the destination deduplicated storage device as a baseline replica;
receiving a second backup data object from a backup appliance, wherein the backup appliance indicates the second backup data object is related to the first backup data object;
creating a snapshot of the baseline replica on the destination deduplicated storage device;
identifying a difference between the first backup data object and the second backup data object on the source deduplicated storage device, wherein identifying the difference comprises:
taking a first initial hash of the first backup data object and a second initial hash of the second backup data object;
determining the first initial hash and the second initial hash are different;
dividing both the first backup data object and the second backup data object into segments;
taking hashes of the segments; and
comparing hashes of the segments;
transmitting the difference from the source deduplicated storage device to the destination deduplicated storage device; and
applying the difference to the snapshot on the destination deduplicated storage device.

2. The method of claim 1, wherein identifying the difference comprises iterating through the first backup data object and the second backup data object.

3. The method of claim 2, further comprising transmitting the differences as they are identified.

4. The method of claim 1, further comprising:
creating a hash fingerprint of the difference;
transmitting the hash fingerprint to the destination deduplicated storage device;
receiving an indication from the destination deduplicated storage device that the destination deduplicated storage device does not have a record of the hash fingerprint; and
transmitting the difference in response to the indication.

5. The method of claim 1, wherein identifying the difference further comprises subdividing the segments to identify more atomic differences.

6. A computer program product comprising a non-transitory computer readable medium having instruction encoded therein for replicating data backups on deduplicated storage devices, the instructions comprising:
replicating a first backup data object from a source deduplicated storage device to a destination deduplicated storage device;
storing the first backup data object on the destination deduplicated storage device as a baseline replica;
receiving a second backup data object from a backup appliance, wherein the backup appliance indicates the second backup data object is related to the first backup data object;
creating a snapshot of the baseline replica on the destination deduplicated storage device;
identifying a difference between the first backup data object and the second backup data object on the source deduplicated storage device, wherein identifying the difference comprises:
taking a first initial hash of the first backup data object and a second initial hash of the second backup data object;
determining the first initial hash and the second initial hash are different;
dividing both the first backup data object and the second backup data object into segments;
taking hashes of the segments; and
comparing hashes of the segments;
transmitting the difference from the source deduplicated storage device to the destination deduplicated storage device; and
applying the difference to the snapshot on the destination deduplicated storage device.

7. The computer program product of claim 6, wherein identifying the difference comprises iterating through the first backup data object and the second backup data object.

8. The computer program product of claim 7, further comprising transmitting the differences as they are identified.

9. The computer program product of claim 6, further comprising:
creating a hash fingerprint of the difference;
transmitting the hash fingerprint to the destination deduplicated storage device;
receiving an indication from the destination deduplicated storage device that the destination deduplicated storage device does not have a record of the hash fingerprint; and
transmitting the difference in response to the indication.

10. The computer program product of claim 6, wherein identifying the difference further comprises subdividing the segments to identify more atomic differences.

11. A system for replicating data backups on deduplicated storage devices, the system comprising:
a backup appliance comprising instructions for managing data backups;
a source deduplicated storage device comprising a first backup data object, the source deduplicated storing device comprising instructions for:
receiving a second backup data object from the backup appliance;
receiving an indication from the backup appliance that the second backup data object is related to the first backup data object; and
identifying a difference between the first backup data object and the second backup data object on the source deduplicated storage device, wherein identifying the difference comprises:
taking a first initial hash of the first backup data object and a second initial hash of the second backup data object;
determining the first initial hash and the second initial hash are different;
dividing both the first backup data object and the second backup data object into segments;
taking hashes of the segments; and comparing hashes of the segments;
a destination deduplicated storage device comprising a baseline replica copy of the first backup data object, the destination deduplicated storage device comprising instructions for:
creating a snapshot of the baseline replica copy of the first backup data object;
receiving the difference from the source deduplicated storage device; and
applying the difference to the snapshot.

12. The system of claim 11, wherein identifying the difference comprises iterating through the first backup data object and the second backup data object.

13. The system of claim 12, further comprising transmitting the differences from the source deduplicated storage device to the destination deduplicated storage device as they are identified.

14. The system of claim 11, wherein identifying the difference further comprises subdividing the segments to identify more atomic differences.

* * * * *